US006795309B2

(12) United States Patent
Hartung et al.

(10) Patent No.: US 6,795,309 B2
(45) Date of Patent: Sep. 21, 2004

(54) TOOL-LESS FIELD REPLACEABLE PERIPHERAL MOUNTING SYSTEM

(75) Inventors: Steven F. Hartung, Boulder, CO (US); David T. Hoge, Westminster, CO (US); William J. Vanderheyden, Loveland, CO (US); Kevin Sean Fletcher, Boulder, CO (US)

(73) Assignee: Quantum Corporation, Milpitas, CA (US)

( * ) Notice: Subject to any disclaimer, the term of this patent is extended or adjusted under 35 U.S.C. 154(b) by 33 days.

(21) Appl. No.: 10/251,081

(22) Filed: Sep. 20, 2002

(65) Prior Publication Data

US 2004/0057201 A1 Mar. 25, 2004

(51) Int. Cl.[7] .................................................. G06F 1/16
(52) U.S. Cl. ...................... 361/685; 361/727; 361/686; 248/346.03; 248/27.1
(58) Field of Search .................. 361/679–685, 361/686–687, 724–727, 692–699; 360/97.01, 98.01, 97.03, 98.03; 312/223.1–223.3; 248/633–638, 618, 346.03, 500, 316.7, 229.16, 229.26, 346.04, 224.41, 224.51, 224.61, 27.1, 27.3

(56) References Cited

U.S. PATENT DOCUMENTS

| | | | |
|---|---|---|---|
| 4,979,909 A | 12/1990 | Andrews | |
| 5,192,143 A | * 3/1993 | Lajara et al. | ................. 403/24 |
| 5,262,923 A | 11/1993 | Batta et al. | |
| 5,301,088 A | 4/1994 | Liu | |
| 5,340,340 A | 8/1994 | Hastings et al. | |
| 5,768,099 A | 6/1998 | Radloff et al. | |
| 5,788,211 A | 8/1998 | Astier | |
| 5,890,693 A | * 4/1999 | Do et al. | ................ 248/346.03 |
| 6,299,266 B1 | 10/2001 | Justice et al. | |
| 6,392,884 B1 | * 5/2002 | Chou | .......................... 361/687 |
| 6,404,641 B1 | * 6/2002 | Fisk et al. | .................... 361/727 |
| 6,496,363 B1 | * 12/2002 | Li | ............................... 361/685 |
| 6,525,933 B2 | * 2/2003 | Eland | .......................... 361/686 |
| 6,611,424 B2 | * 8/2003 | Huang | ......................... 361/685 |
| 6,616,106 B1 | * 9/2003 | Dean et al. | ................. 248/27.1 |
| 6,621,693 B1 | * 9/2003 | Potter et al. | ................ 361/685 |
| 2003/0112596 A1 | * 6/2003 | Shih | ............................ 361/685 |

* cited by examiner

*Primary Examiner*—Michael Datskovsky
(74) *Attorney, Agent, or Firm*—Patton Boggs LLP

(57) ABSTRACT

A peripheral mounting system for installing, removing and replacing peripheral devices from a chassis without the use of tools. A pair of side brackets secured to the chassis provide slots into which fasteners connected to the side of the peripheral device are installed to restrain the peripheral device. In an embodiment, clips protruding outward from the side of the slots allow the fasteners to slide into position while also retaining the peripheral device in the installed position. The pair of side brackets in conjunction with the fasteners on the peripheral device provide a means for mounting the peripheral device without requiring additional area above or below the peripheral device. A cover latching mechanism may securely latch the cover closed and provides additional retention of the peripheral device in the vertical direction.

11 Claims, 7 Drawing Sheets

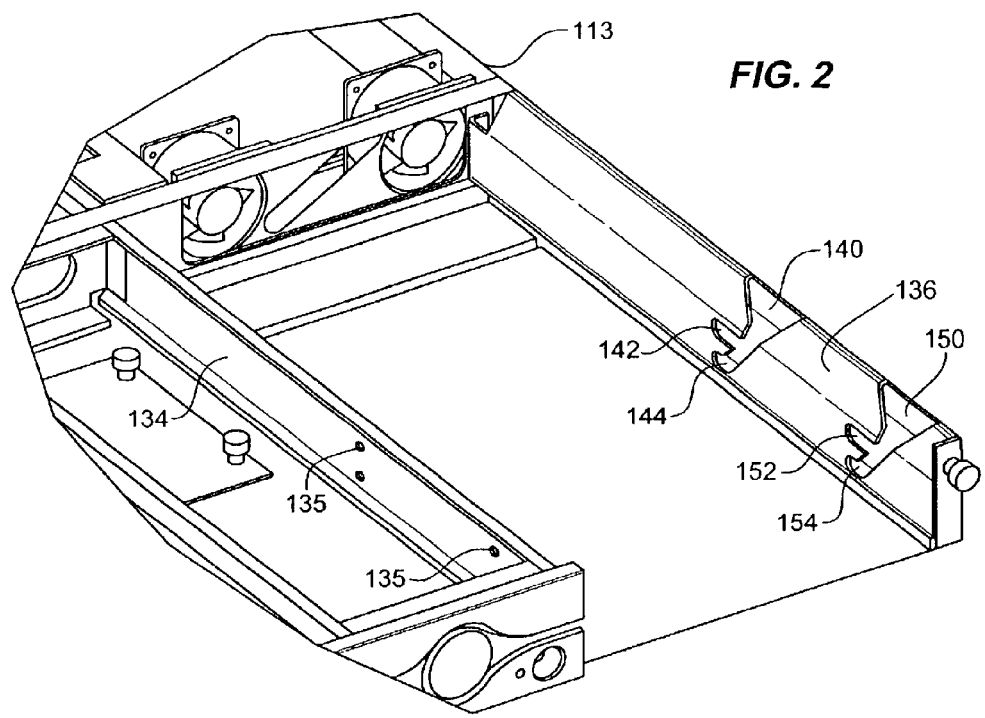
*FIG. 2*
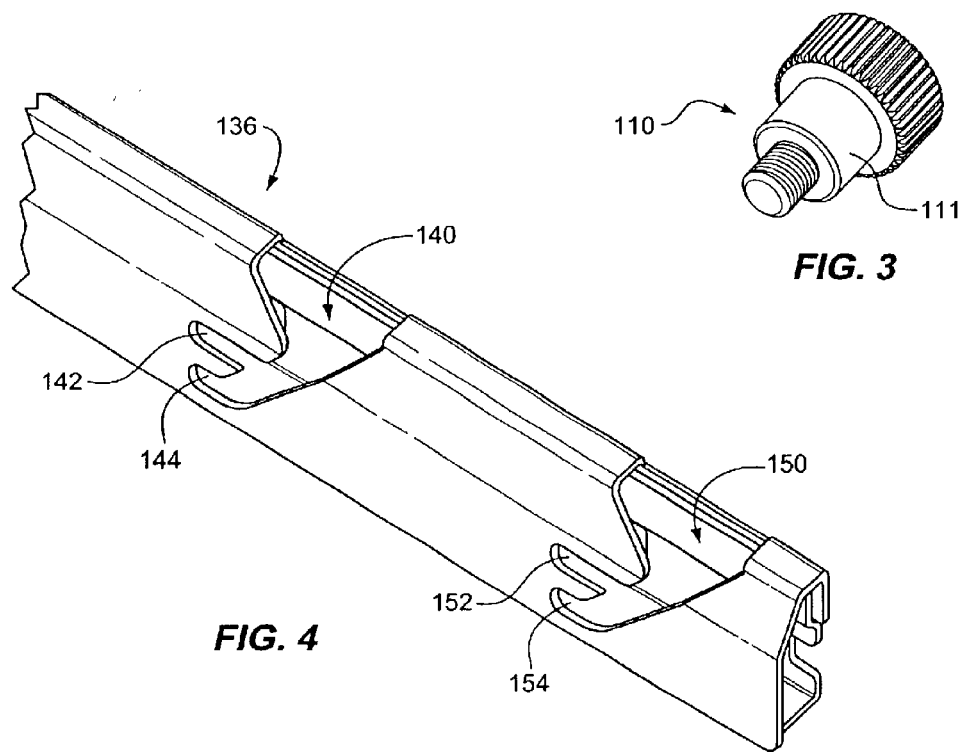
*FIG. 3*
*FIG. 4*

TOOL-LESS FIELD REPLACEABLE PERIPHERAL MOUNTING SYSTEM

FIELD OF THE INVENTION

The invention relates to a mounting system, and in particular, to a mounting system for installing a field replaceable peripheral device on a chassis without the use of tools.

PROBLEM

It is a problem in the field of mounting systems to prevent peripheral devices from shifting position within a chassis while also providing a mounting system to facilitate removal or replacement of the peripheral device without the use of tools.

Modern computer systems and computer operated equipment incorporate one of more peripheral devices, such as mass storage devices, mounted to the chassis within the computer system. These peripheral devices are typically removable for replacement, repair, or other purpose. A wide variety of different components are used to enable mounting/removal of the devices. For example, in certain systems, the peripheral devices are physically secured in position using screws or other conventional fasteners requiring tools for removal or replacement, which make installation and removal time-consuming and cumbersome.

Mounting Rail Systems

Other mounting systems for computer peripheral devices consist of low cost mounting systems requiring tools to attached rail systems or brackets. One such device comprises two flat rectangular side pieces that are attached to opposing sides of the peripheral device. Receiving rails are provided in the area of the chassis where the peripheral device is to be mounted, and are adapted to cooperate with the side pieces in a sliding arrangement. Examples of this type of mounting can be found, for instance, in U.S. Pat. No. 4,979,909, and U.S. Pat. No. 5,262,923. U.S. Pat. No. 5,768,099 describes use of a generally U-shaped bracket to which a peripheral device is screwed. The bracket is then mountable within the computer system without the use of screws. However, when the peripheral device is replaced, the replacement disk drive must have side rails or U-shaped members corresponding to the computer system rail system or the U-shaped bracket must be removed from the failed device and attached to the replacement device. Another problem with the U-shaped bracket arrangement is that the mounting hardware adds width or height to the computer system in which the peripheral device is mounted.

Mounting Tray

Other designs focus on an easily removable tray or bracket which contains the peripheral device. In most cases a tray design also requires tools to mount the peripheral in the tray. Tray designs also add height to the computer system. Examples can be found in U.S. Pat. No. 5,301,088, U.S. Pat. No. 5,340,340, U.S. Pat. No. 5,788,211, and U.S. Pat. No. 5,768,099. Another mounting system uses a tray in combination with clips, or spring actuated pins, to hold a peripheral device in place as described in the Justice tray design (U.S. Pat. No. 6,299,266). Since the removable tray and the U-shaped bracket designs add height to the computer system, computer systems incorporating these designs often are not available in slim profile packaging.

In many cases the emphasis of these designs is to aid in reducing the manufacturing labor. Often these systems are difficult for an untrained user in the field to operate when performing maintenance on the computer system or replacing a filed peripheral device. Systems relying on springs to retain a device are often inadequate for higher mass devices which can overcome the spring retention under shock conditions, thus many of these mounting systems are designed principally for relatively small low mass devices such as hard drives. Stronger springs can be used to retain heavier items, but stronger springs are harder for a user to manipulate without the use of tools.

An additional consideration is to allow for use with peripheral devices that have an exposed front bezel for display purposes or removable media. Many low cost and ease of use mounting systems are designed for hard drives and are internal to a system with no exposed bezel and no need for accurate alignment of the front of the device. When the peripheral device is a tape drive or other device having removable medium, the mounting systems described above often rely on fasteners or brackets placed in front of the peripheral device and nor not suitable for removable media peripheral devices.

Another problem is encountered when mounting peripheral devices in thin-profile computer systems. When mounting in a shallow flat case it is most desirable to install devices from the top, since removal of a top cover gives access to the entire system. The most common method of mounting in this type of arrangement is to attach angled brackets or a tray to the peripheral with screws and then to attach the brackets to the chassis with additional screws. While being very secure and very inexpensive, this is not easily accomplished by a customer in the field.

For these reasons, a need exists for mounting system for vertically installing a peripheral device within a thin rack mount chassis that does not add to the chassis height or interfere with the front bezel and allows removal and or replacement of the peripheral device in the field by untrained individuals without tools while also providing adequate retention for resistance to shock and vibration.

SOLUTION

The present tool-less field replaceable peripheral mounting system overcomes the problems outlined above and advances the art by providing an apparatus wherein the peripheral device is quickly installed into a chassis without the use of tools. The chassis comprises a pair of side brackets secured to the chassis.

In an embodiment, a side bracket in conjunction with a center bracket restrain the installed peripheral device vertically and horizontally. The side bracket in this embodiment includes at least one vertical slot transitioning into at least one horizontal slot. A fastener protruding from a side of the peripheral device slides into the slot to restrain the peripheral device in a horizontal direction the center bracket includes at least one hole corresponding to at least one mounting hole in the opposite side of the peripheral device. The peripheral device is secured to the center bracket using fasteners, such as shoulder thumbscrews, that extend through the holes in the center bracket and into the peripheral device to restrain the peripheral device in a vertical direction. The shoulder thumbscrews are easily attached or removed by hand without the use of tools. The use of the side bracket in conjunction with the center bracket, allows a peripheral device to be installed in a chassis having a height that is approximately the same height as the peripheral device.

In another embodiment, the peripheral device includes thumbscrews protruding from the right and left side of the peripheral device corresponding to the slots in the pair of side brackets. As the peripheral device is inserted into the computer chassis, the shoulder of the fastener slides into the slots in the pair of side brackets. The side brackets and outwardly projecting clips therein restrain movement of the installed peripheral device in the vertical and the horizontal direction. A latching top cover provides additional restraint of the peripheral device in the vertical direction. Thus, the top cover in combination with the side brackets holds the installed peripheral device securely in place.

BRIEF DESCRIPTION OF THE DRAWINGS

FIG. 2 illustrates an exploded view of a portion of the present tool-less field replaceable peripheral mounting system of FIG. 1;

FIG. 3 illustrates a perspective view of a shoulder thumbscrew for use with the present tool-less field replaceable peripheral mounting system;

FIG. 4 illustrates the side bracket of an embodiment of the present tool-less field replaceable peripheral mounting system;

DETAILED DESCRIPTION

The tool-less field replaceable peripheral mounting system summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 1:
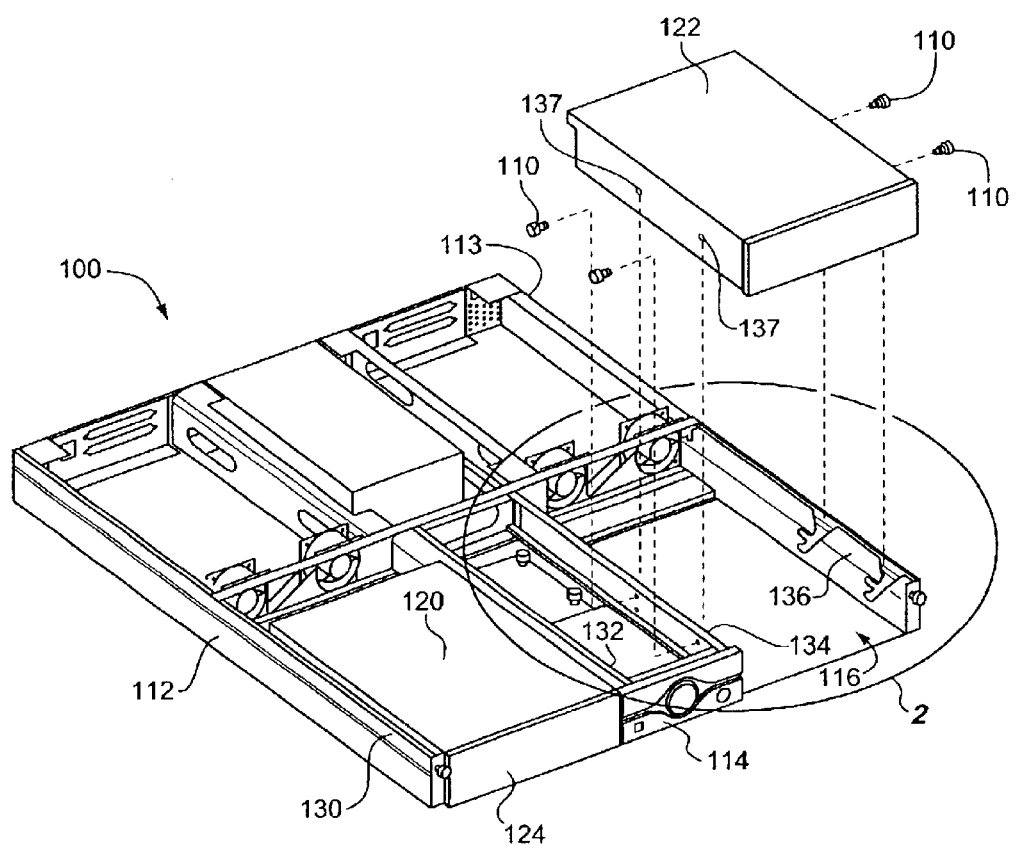
FIG. 1 illustrates a perspective view of the present tool-less field replaceable peripheral mounting system for installing two single reel tape drives in a dual tape drive enclosure.

A computer equipment chassis 100 incorporating the present tool-less field replaceable peripheral mounting system is illustrated in FIG. 1. The computer equipment chassis 100 comprises a left and right side 112 and 113 respectively, and two center brackets 132 and 134. Left and right side brackets 130 and 136 are secured to the left and right side 112 and 113 of the computer equipment chassis 100. A combination of one side bracket and one center bracket provides an enclosure for housing a peripheral device. For example, peripheral device 122 is mounted between right side bracket 136 and center bracket 134 while peripheral device 120 is mounted between left side bracket 130 and center bracket 132.

The computer equipment illustrated and described is a rack mounted dual tape drive device although alternative configurations and uses may be substituted. Still referring to FIG. 1, peripheral devices 120 and 122, tape drives in this example, are mounted within chassis 100 with the height of peripheral devices 120 and 122 approximately the same height as the chassis 100 into which peripheral devices 120 and 122 are mounted. In other words, the form factor of chassis 100 and peripheral devices 120 and 122 installed therein are substantially the same. The "form factor" refers generally to the peripheral dimensions of the chassis and the tape drives. In this example, the computer equipment chassis 100 is an industry standard half-high (1.5 inch high) form factor and peripheral devices 120 and 122 are single reel tape drives also having a half-high form factor. Thus, there is no additional vertical area within computer equipment chassis 100 for a mounting system above or below peripheral devices 120 and 122. Providing a mounting system wherein the peripheral device is secured from the side of the peripheral device instead of the top and bottom provides a fully assembled computer equipment chassis that meets the industry standard form factor.

For illustration, the fastener for removably securing peripheral device 120 in side brackets 130 and 136 is shoulder thumbscrew 110, shown in FIG. 3. The present tool-less field replaceable peripheral mounting system includes shoulder thumbscrews 110, four in this example, for securing peripheral device 122 within the enclosure. Referring to the exploded peripheral view of one enclosure for housing a peripheral device of FIG. 2 in conjunction with FIG. 1, right side thumbscrews are connected to peripheral device 122 prior to mounting peripheral device 122 into the enclosure. In this embodiment, as peripheral device 122 is lowered into the enclosure, shoulder thumbscrews 110 slide into the slots provided on right side bracket 136. With peripheral device 122 within the enclosure, additional shoulder thumbscrews 110 pass through mounting holes 135 in center bracket 134 to mate with corresponding mounting holes 137 in the tape drive as illustrated by the dashed lines in FIGS. 1 and 2.

Side Brackets—FIGS. 4–11:

In the first embodiment illustrated in FIG. 4, side bracket 136 is a channel 138 including two vertical slots 140 and 150 extending downward on one side of the channel 138 for removably receiving shoulder thumbscrews 110 protruding from the peripheral device 122. Referring back to FIGS. 1 and 2, side bracket 136 is securely mounted to the right side 113 of computer equipment chassis 100. Each one of the two vertical slots 140 and 150 include a top horizontal slot 142 and 152, and a bottom horizontal slot 144 and 154 integral to the vertical slots 140 and 150. The number of vertical slots provide in the side bracket as well as the number of horizontal slots integral to each vertical slot may vary depending on the length and the height of the peripheral device being mounted within the computer equipment chassis. The top of vertical slots 140 and 150 is wide enough to receive the shoulder thumbscrew 110 and to allow the thumbscrew to move horizontally as the thumbscrew slides into the vertical slot. Likewise, the top and bottom horizontal slots are of sufficient width for the shoulder 111 of thumbscrew 110 to slide horizontally into a seated position with the horizontal slot.

The side bracket just described includes two horizontal slots, an upper horizontal slot and a lower horizontal slot, extending from each vertical slot. Peripheral devices may have alternative mounting configuration including an upper fastener, a lower fastener or a set including both an upper and a lower fastener. Therefore, the side bracket may be configured to include any variety of vertical and horizontal slots to match the mounting configuration of the peripheral device which are standard on conventional half-height form factor disk drives.

Figure 5:
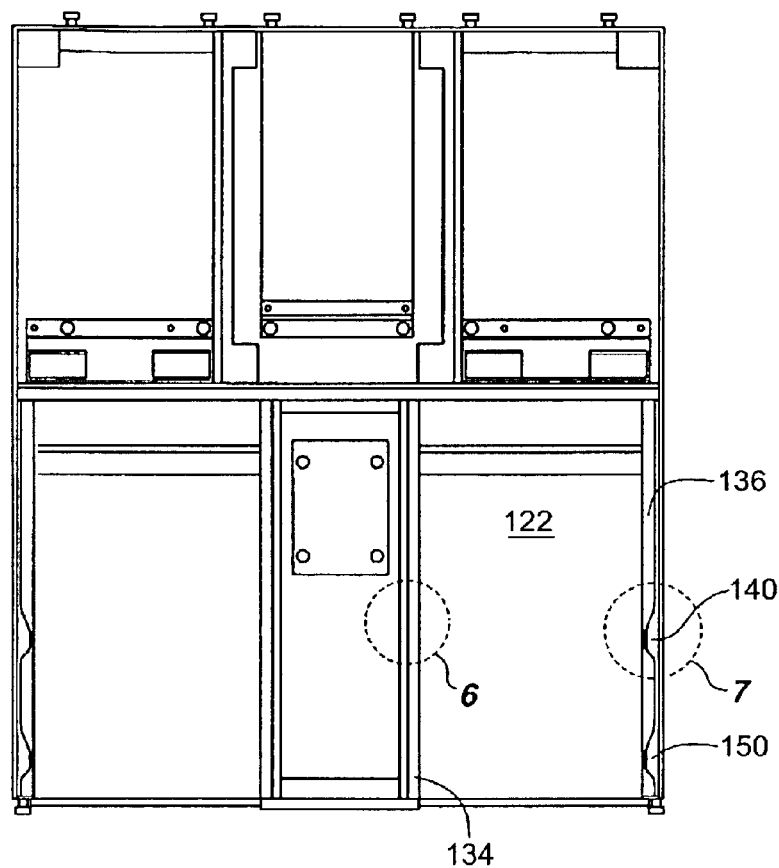
FIG. 5 illustrates a top view of a computer equipment chassis incorporating the present tool-less field replaceable peripheral mounting system.
Figure 6:
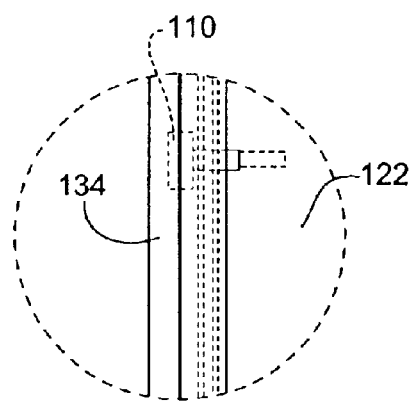
FIG. 6 illustrates an exploded view of the thumbscrew of FIG. 3 for installing one side of a peripheral device in a computer equipment chassis incorporating the present tool-less field replaceable peripheral mounting system.
Figure 7:
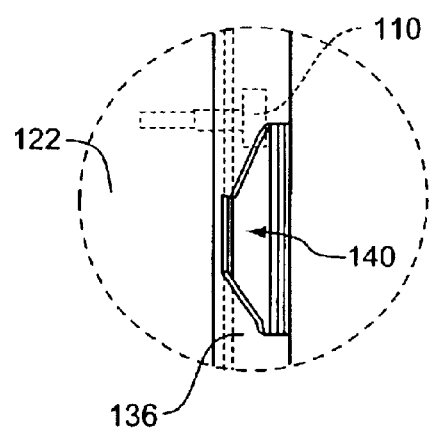
FIG. 7 illustrates an exploded view of the thumbscrew of FIG. 3 for installing another side of a peripheral device in a computer equipment chassis utilizing the side bracket of FIG. 4.

Referring to the computer equipment chassis top view of FIG. 5, when peripheral device 122 is mounted within the right side enclosure of the computer equipment chassis 100, the left side of the peripheral device 122 is secured along center bracket 134 while the right side of peripheral device 122 is secured with right side bracket 136. FIG. 6 illustrates an exploded view of the left side of peripheral device 122 mounted to center bracket 134. Shoulder thumbscrew 110 passes through center bracket 134 and into peripheral device 122 as illustrated by the dashed lines. Similarly, FIG. 7 illustrates an exploded view of the right side of peripheral device 122 mounted to right side bracket 136. Shoulder thumbscrews 110 protruding from the right side of the peripheral device 122 slide into vertical slots 140 and 150. Shoulder thumbscrew 110 slides further into the vertical slot to a seated position.

Figure 8:
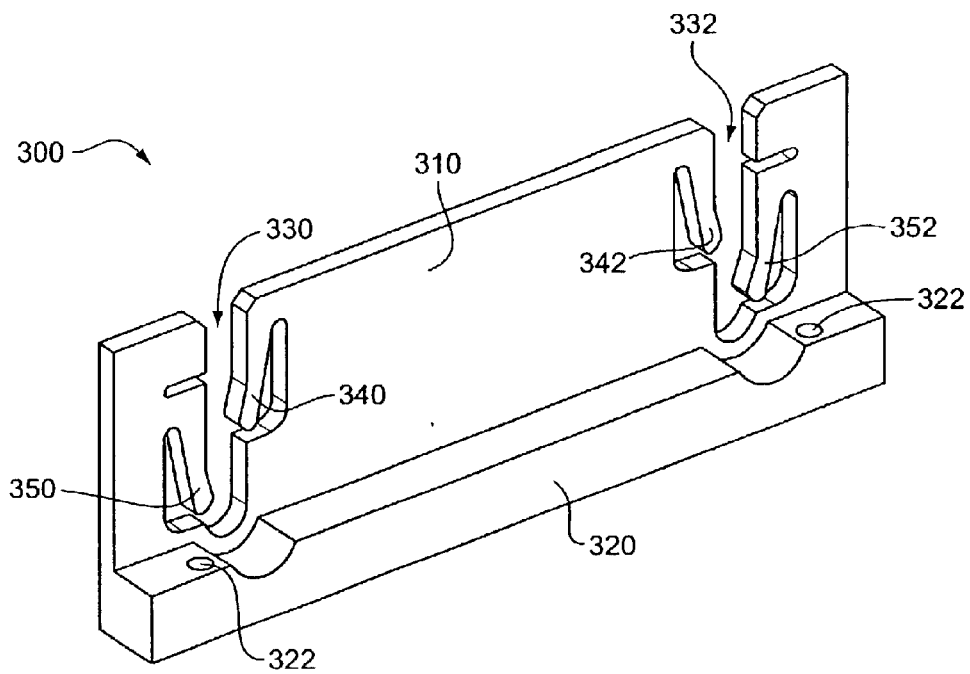
FIG. 8 illustrates the clip-in brackets of an embodiment of the preset tool-less field replaceable peripheral mounting system.

In another embodiment illustrated in FIG. 8, side bracket 300 is a single molded side bracket comprising side wall 310 and horizontal base 320 extending perpendicularly outward from the bottom edge of side wall 310. Horizontal base 320 includes mounting holes 322 for securing side bracket 310 to chassis 100 in a perpendicular orientation using conventional fasteners.

Side bracket 300 of FIG. 8 comprises two slots 330 and 332 for removably receiving the peripheral device and each slot includes and an integral upper and a lower clip 340, 342, 350 and 352 projecting outwardly from the sides of the slots. The number of slots and the number of outwardly projecting clips integral to each slot may vary, depending on the height of the peripheral device being mounted. In the embodiment of FIG. 8, two clips are shown in each slot. One clip projects outward from the left side of the slot and one clip projects outward from the right side of the slot with one clip above the other. Providing an upper and a lower clip allows the side bracket to accept peripheral devices using either the upper or the lower clip which correspond to upper and lower mounting holes that are standard on conventional half-height form factor disk drives.

Figure 9:
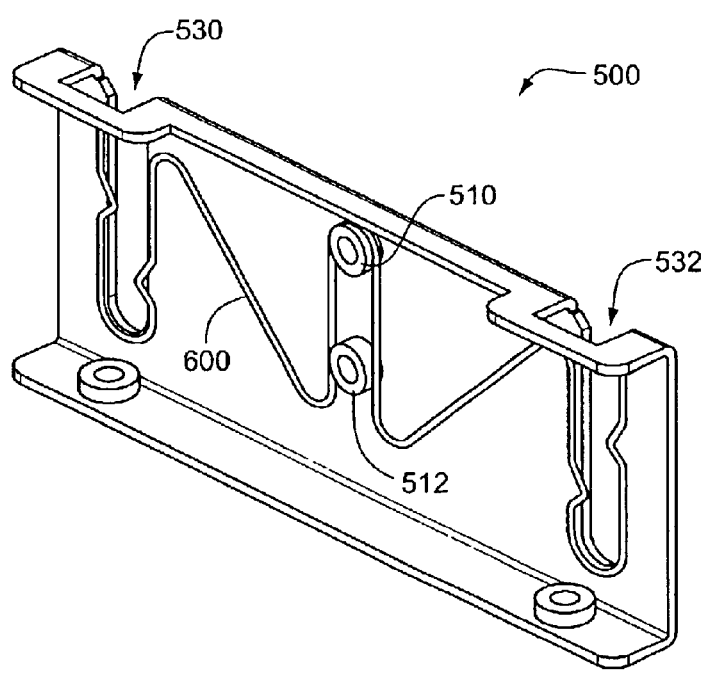
FIG. 9 illustrates a side bracket of another embodiment of the present tool-less field replaceable peripheral mounting system embodiment.
Figure 10:
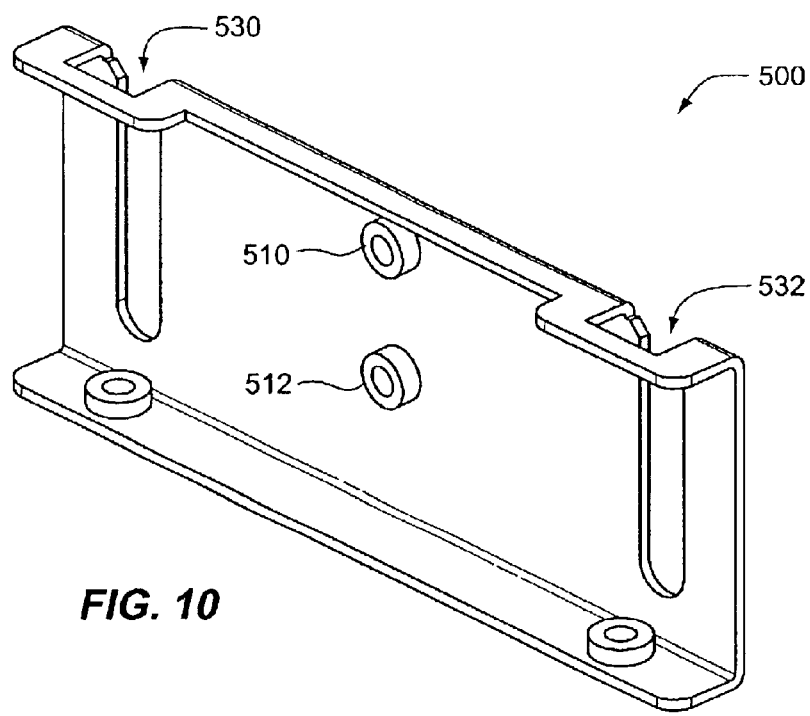
FIG. 10 illustrates the U-shaped bracket of FIG. 9.
Figure 11:
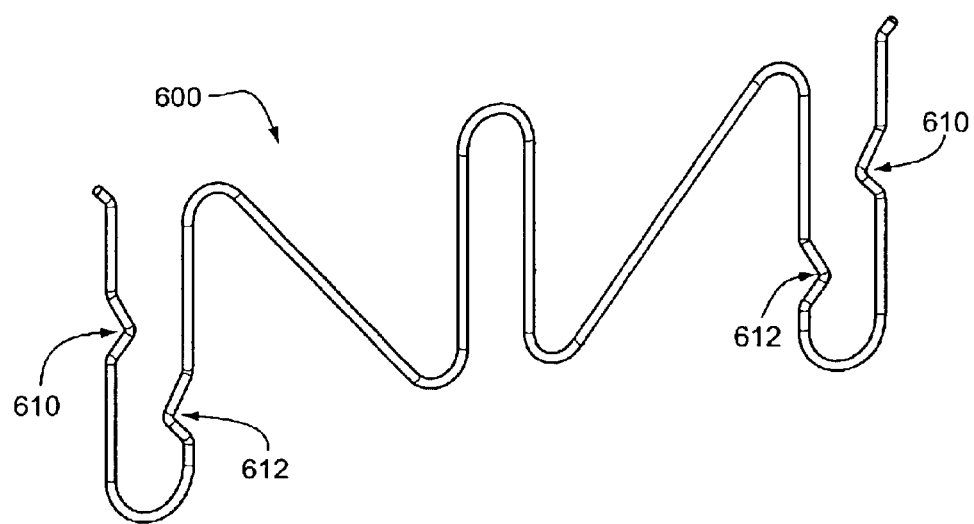
FIG. 11 illustrates a spring clip for use with the U-shaped bracket of FIG. 10.

In the embodiment of FIG. 9, the side bracket comprises a U-shaped bracket 500 and spring clip 600 and mounting posts 510 and 512 for attaching spring clip 600. Referring to FIG. 10, U-shaped bracket 500 includes left and right slots 530 and 532. Spring clip 600 is formed to attach to U-shaped bracket 500 by securing the center section of spring clip 600 around mounting posts 510 and 512 as shown in FIG. 9. Spring clip 600 illustrated in FIG. 11 includes integral upper and lower clips 610 and 612 that correspond with left and right slots 530 and 532. With spring clip 600 secured to U-shaped bracket 500, top and bottom clips 610 and 612 project outwardly into left and right slots 530 and 532.

Figure 12:
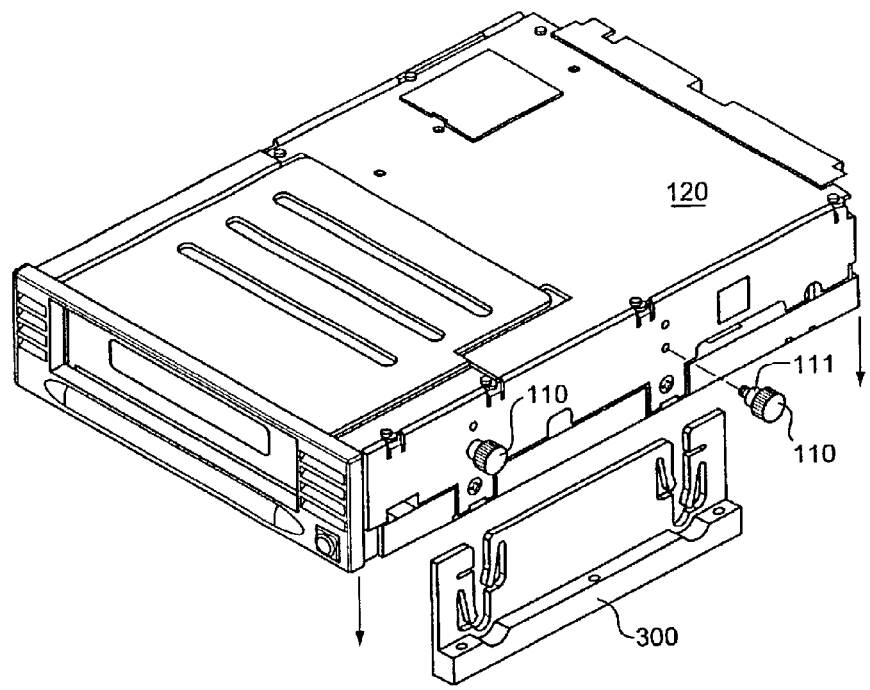
FIG. 12 illustrates a perspective view of the installation of a peripheral device into the clip-in bracket of FIG. 8 using the thumbscrew of FIG. 34.

Operational Characteristics—FIGS. 1–2 and 12:

Referring to FIG. 2, shoulder thumbscrew 110 fastens to one side of peripheral device 120. As peripheral device 120 is lowered into the computer equipment chassis, shoulder 111 of shoulder thumbscrews 110 slides into the corresponding left and right slots. The diameter of the slot is larger than the diameter of the shoulder of the shoulder thumbscrew to allow the shoulder thumbscrew to slide into the slot. The top of the vertical slot is wide enough to allow the shoulder thumbscrew to move as the peripheral device is inserted into the computer equipment chassis. Depending on the location of the shoulder thumbscrew on the peripheral device, the shoulder thumbscrew follows the horizontal slot until the peripheral device is fully installed into the computer equipment chassis. Once installed, the opposite side of the peripheral device is secured to the center bracket using convention fasteners, shoulder thumbscrews in this example.

In the embodiment just described, side brackets 130 and 136 secure the peripheral device in the horizontal direction while the connection to the center brackets 132 and 134 secure the peripheral device in the horizontal direction. This configuration retains the peripheral devices in the horizontal and vertical direction while maintaining the height of the computer equipment to the thinnest possible package. Thus, allowing installation of industry standard half-high (1.5 inch high) form factor tape drives into a half-high computer equipment chassis.

In the embodiment illustrated in FIG. 8, the distance top and bottom clips 340 and 350 protrude into the slot reduce the diameter of slot 330 to less than the diameter of shoulder 111 of shoulder thumbscrew 110. As the shoulder thumbscrew slides into the slot, the shoulder thumbscrew exerts a force on the clip, pushing the clip out of the slot and allowing the shoulder thumbscrew to slide further into the slot. As the shoulder thumbscrew is inserted past the clip, the force is removed from the clip and the clip springs back into the slot, locking the shoulder thumbscrew into the portion of the slot below the clip.

Figure 13:
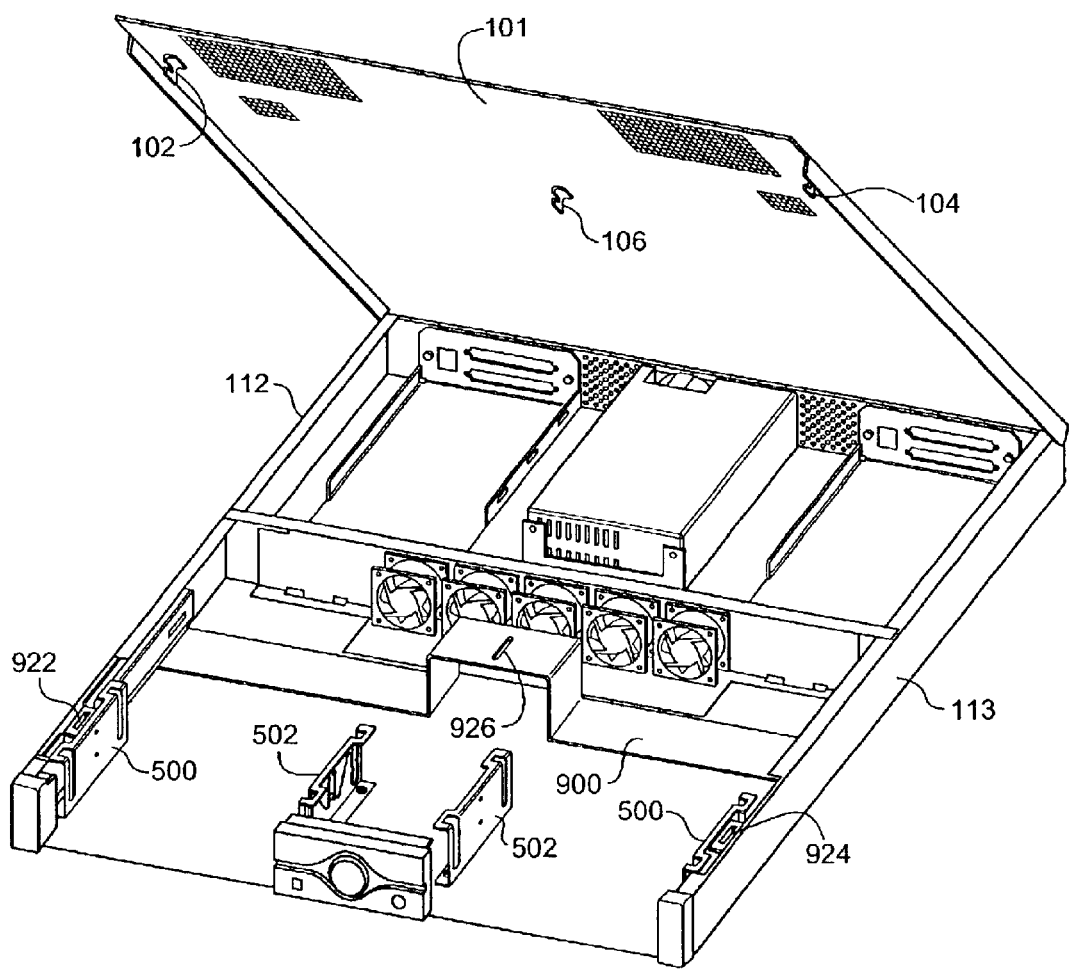
FIG. 13 illustrates a perspective view of a computer equipment chassis incorporating the present tool-less field replaceable peripheral mounting system embodiment of FIGS. 10 and 11.

In the embodiment illustrated in FIG. 9, peripheral device 120 includes two shoulder thumbscrews 110 extending outwardly from both side. Referring to FIG. 13, side brackets 130 and 132 are secured to chassis 100 in a perpendicular orientation with left side bracket 130 adjacent and parallel to side 112 of chassis 100. Right side bracket 132 is secured to base 116 parallel to and a distance from left side bracket 130 to allow peripheral device 120 to securely fit between left and right side brackets 130 and 132. The installed peripheral device is removed from the left and right side brackets by lifting the peripheral device out of the clips. As a force is applied to lift the peripheral device from the clips, the shoulder thumbscrew pop out of the clips just as easily as the shoulder thumbscrews were inserted. Once removed, the shoulder thumbscrews can be transferred to a new peripheral device for installation. Thus, the shoulder thumbscrews are easily removed and attached by hand without the use of tools.

As peripheral device 120 is installed in chassis 100, shoulder thumbscrews 110 slide into the slots of left and right side brackets and the bezel of peripheral device 120 is adjacent to front plate 114, forming a continuous front plate. Providing an apparatus for horizontally securing peripheral devices from the left and the right sides allows access for inserting and extracting tape cartridges.

The tool-less field replaceable peripheral mounting system in the second embodiment illustrated in FIG. 13, further comprises a cover 101 for securing the peripheral devices 120 and 122 in the vertical direction. The computer equipment chassis includes side brackets 130, 132, 134, 136 and cover latching mechanism 900 that are secured to the lower interior surface of chassis 100. Once the peripheral devices 120 and 122 are installed in the computer equipment chassis 100, cover 101 secures the peripheral devices vertically within the computer equipment chassis 100.

Figure 14:
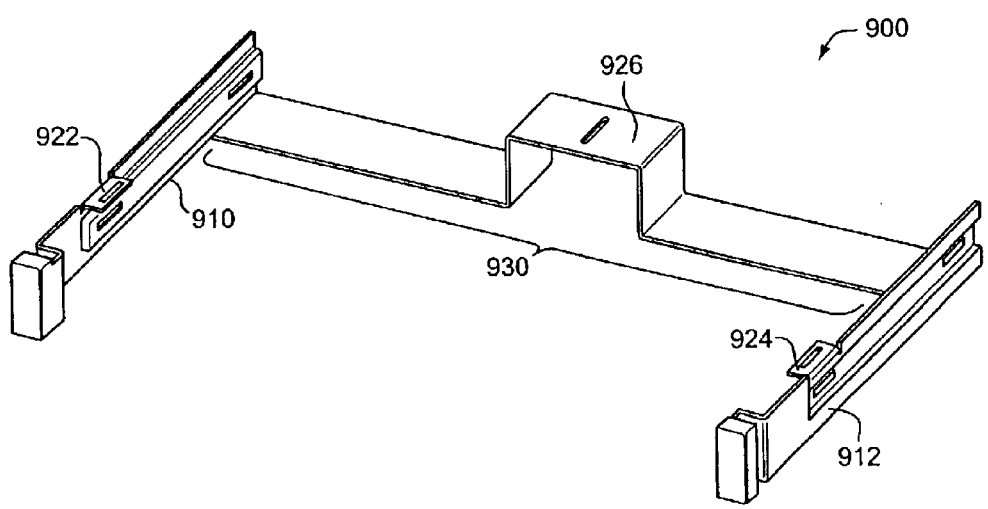
FIG. 14 illustrates the cover latching mechanism of the present tool-less field replaceable peripheral mounting system embodiments of FIG. 9.

Locking Cover Mechanism—FIGS. 13–14:

In the embodiments of FIGS. 8–9 and 13, chassis 100 includes a hinged cover 101 for enclosing the top of the dual tape drive. Cover 101 includes front latching devices 102 and 104 rear latching device 106 projecting outwardly from the interior surface of cover 110 in a perpendicular orientation. Referring to FIG. 13, cover latching mechanism 900 comprises parallel left and right sides 910 and 912 and a rear member 930 extending perpendicularly from the rear bottom edge of left and right sides 910 and 912. Rear member 930 includes a rear latch slot 926 for receiving rear latching device 106 on cover 101. Likewise, left and right sides 910 and 912 include left and right latch slots 922 and 924 for receiving left and right latching devices 102 and 104 respectively.

Cover latching mechanism 900 is secured to the base 116 of chassis 100 with the left and right sides 910 and 912 adjacent and parallel to chassis 100 left and right sides 112 and 113. Cover latching mechanism 900 is orientated so that when cover 110 is in the closed position, left and right latching devices 102 and 104 insert into right and left latching devices 922 and 924 and rear latching device 106 inserts into rear latch slot 926. Once closed, the latching devices are locked into position from the external surface of the cover using conventional latching mechanisms.

Closing the cover and locking the latching devices causes the interior cover surface to come into contact with the top of the peripheral devices. This configuration retains the peripheral devices in the vertical direction while maintaining the height of the computer equipment to the thinnest possible package. Thus, allowing installation of industry standard half-high (1.5 inch high) form factor tape drives into a half-high computer equipment chassis.

As to alternative embodiments, those skilled in the art will appreciate that the present tool-less field replaceable peripheral mounting system has been illustrated and described for use installing tape drives in a dual tape drive device although the apparatus could be used to install alternative devices into alternative packages. Similarly, while the peripheral devices described and illustrated included front bezels the were necessary to access without opening the computer equipment, the present tool-less field replaceable peripheral mounting system could be used to install peripheral devices that are not exposed.

It is apparent that there has been described, a tool-less field replaceable peripheral mounting system that fully satisfies the objects, aims, and advantages set forth above. While the tool-less field replaceable peripheral mounting system has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed:

1. A peripheral mounting system for removably installing a half-height form factor peripheral device in a half-height form factor computer equipment chassis having two sides and a base, said system comprising:
    a means for fastening protruding perpendicularly a distance from a first side of said half-height peripheral device;
    a means for horizontally securing said half-height peripheral device within said half-height computer equipment chassis, said horizontally securing means comprising a side bracket having at least one slot extending downward from a top edge thereof, wherein said fastening a correspond to said at least one slot in said side bracket for removably receiving said fastening means and securing said half-height peripheral device in said horizontal direction; and
    a means for vertically securing said half-height peripheral device in a vertical direction, said vertically securing means comprising a center bracket having a hole for receiving a fastening device which corresponds to a mounting hole in a second side of said half-height peripheral device, wherein said fastener attached said half-height peripheral device to said half-height peripheral device to secure said half-height peripheral device in said vertical direction.

2. The system of claim 1 wherein said horizontally securing means comprises:
    a first and second side bracket secured to each of said two sides of said half-height computer equipment chassis, said first and second side brackets including at least one slot extending downwardly from a top edge thereof, wherein said fastening means interfaces with said at least one slot in said first and second side bracket for horizontally securing said half-height peripheral device in said horizontal direction; and
    a clip protruding outward from a side of said at least one slot for further securing said half-height peripheral device.

3. The system of claim 1 wherein said half-height computer equipment chassis includes a cover having at least two latching devices protruding outward from an interior surface thereof, and said vertically securing means comprises:
    a cover latching mechanism secured to said half-height computer equipment chassis, said cover latching mechanism having at least two latch slots for receiving said at least two latching devices, wherein when said cover of said half-height computer equipment chassis is in a closed position said cover retains said half-height peripheral device in said vertical position.

4. A peripheral mounting system for removably installing a peripheral device in a computer equipment having three sides and a base, said system comprising:
    a fastener protruding perpendicular from a side of said peripheral device;
    a side bracket secured to at least one of said three sides of said computer equipment, said side bracket including at least one slot extending downward from a top edge thereof, wherein said fastener corresponds to said at least one slot in said side bracket for removably receiving said fastener and securing said peripheral device in a horizontal direction;
    a means for vertically securing said peripheral device in a vertical direction, wherein said vertically securing means restrains a peripheral device into a computer equipment while maintaining a computer equipment height that slightly exceeds a peripheral device height;
    a center bracket having at least one hole corresponding to said mounting hole in said one side of said peripheral device; and
    a removable fastener for connecting said peripheral device to said side bracket for restraining said peripheral device in said vertical direction.

5. The peripheral mounting system of claim 4 wherein said side bracket further comprises:

at least one clip protruding outward from at least one side of said at least one slot for further securing said peripheral device within said computer equipment.

6. The peripheral mounting system of claim 4, for a peripheral device having two or more fasteners protruding outward from a first and second side thereof and said computer chassis includes a first and a second side bracket, wherein said first and second side brackets further comprise:

two or more slots extending downward from said top edge of said first and second side brackets, wherein a width of said two or more slots is slightly wider than an outer diameter of said two or more fasteners to allow said two or more fastener to travel the length of said two or more slots; and at least one clip integral to and protruding outward from at least one side of or more slots to restrain said peripheral device in said vertical direction.

7. The peripheral mounting system of claim 4, for use with a peripheral device having two or more fasteners protruding outward from a first and second side thereof and said computer chassis includes a first and a second side bracket, wherein said first and second side brackets further comprise:

a U-shaped bracket having two slots extending downward from a top edge thereof, wherein a bottom edge of said U-shaped bracket secures said U-shaped bracket to said base of said computer equipment;

a spring clip molded to correspond to said two slots in said U-shaped bracket to form one or more clips that protrude into each one of said two slots for removably receiving said first and second fastener of said peripheral device; and a mounting means integral to said U-shaped bracket for securing said spring clip to said U-shaped bracket.

8. The peripheral mounting system of claim 4, wherein said computer equipment includes a cover having at least two latching devices protruding outward from an interior surface thereof, said system further comprising:

a cover latching mechanism secured to said base of said computer equipment, said cover latching mechanism having at least two latch slots for receiving said at least two latching devices, wherein when said cover of said computer equipment is in a closed position said cover further retains said peripheral device in said vertical direction.

9. A peripheral mounting system for use with a chassis having three sides and a base for securing a peripheral device within said computer device, said peripheral device including a first fastener protruding from a first side and a mounting hole for receiving a second fastener on an opposite side, said system comprising:

a side bracket attached to one of said three sides of said chassis and having at least one slot extending downward from a top edge thereof, wherein said fastener correspond to said at least one slot in said side bracket for removably receiving said fastener and securing said peripheral device in a horizontal direction; and a center bracket having a hole for receiving a second fastening device which corresponds to said mounting hole, wherein said fastener attaches said peripheral device to said chassis to secure said peripheral device in a vertical direction while maintaining a chassis height that slightly exceeds a peripheral device height.

10. A peripheral mounting system for use with a computer device having a left and a right side, a cover and a base, the cover of the computer device having at least two latching devices protruding outward from the interior surface thereof, the system comprising:

a peripheral device contained within a housing having a left and a right side and having a first and second fastening device protruding outward from each the left and the right side thereof;

a left and right side bracket extending perpendicular from the base and parallel to the left and right side of the computer device, the left and the right side bracket comprising:

a first and second slat extending downward from a top edge of the left and right side bracket for removably receiving the first and second fastening device to restrain the first and second fastening device in a horizontal direction;

at least one clip protruding outward from at least one side of the first and second slot to restrain the first and second fastening device in a vertical direction; and a cover latching mechanism secured to the base of the computer device, the cover latching mechanism having at least two latch slots for receiving the at least two latching devices, wherein when the cover of the computer device is in the closed position the cover retains the peripheral device in the vertical position.

11. The mounting system of claim 10, wherein the left and the right side bracket comprise:

a U-shaped bracket having two slots extending downward from a top edge thereof, wherein a bottom edge of the U-shaped bracket secures the U-shaped bracket to the base of the computer device;

a spring clip molded to correspond to the two slots in the U-shaped bracket to form one or more clips that protrude into each one of the two slots for removably receiving the first and second fastening device protruding from the peripheral device; and a mounting means integral to the U-shaped bracket for securing the spring clip to the U-shaped bracket.

* * * * *